UNITED STATES PATENT OFFICE.

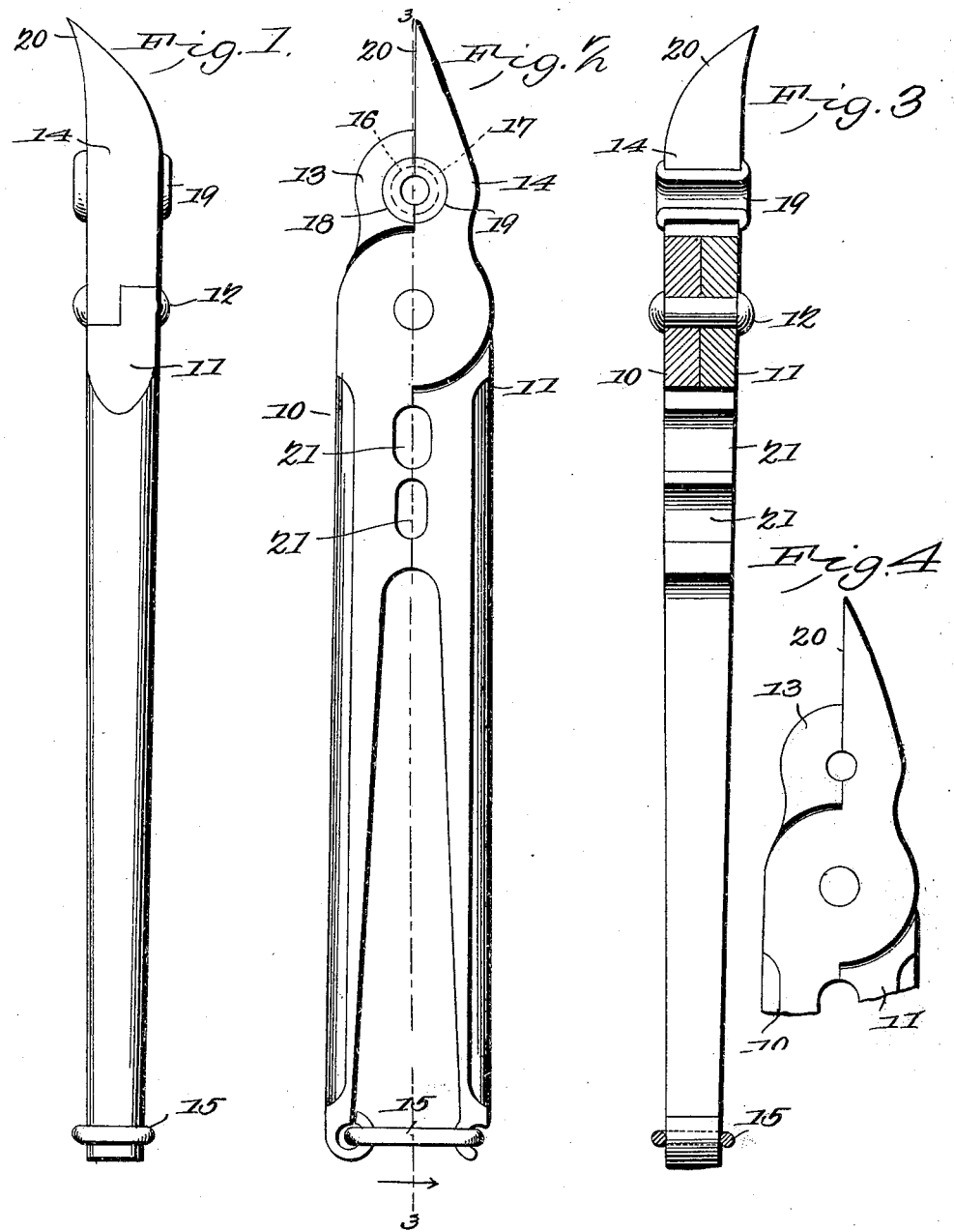

FREDERIC W. BARBER, OF WEEDSPORT, NEW YORK, ASSIGNOR TO JOHN D. EDWARDS, OF WEEDSPORT, NEW YORK.

WIRE-WORKING IMPLEMENT.

No. 799,964.      Specification of Letters Patent.      Patented Sept. 19, 1905.

Application filed August 12, 1904. Serial No. 220,576.

*To all whom it may concern:*

Be it known that I, FREDERIC W. BARBER, a citizen of the United States, residing at Weedsport, in the county of Cayuga and State of New York, have invented a new and useful Wire-Working Implement, of which the following is a specification.

This invention relates to improved implements employed by workmen in stringing electric conductor-wires, more particularly the insulated conductor-wires for electric lighting, and has for its object to simplify and improve the construction and produce an inexpensive and efficient implement by means of which the labor and time employed in stringing the wires are materially decreased and with greatly-improved results.

With these and other objects in view, which will appear as the nature of the invention is better understood, the same consists in certain novel features of construction, as hereinafter described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a side elevation. Fig. 2 is a front elevation, and Fig. 3 is a sectional view on the line 3 3 of Fig. 2. Fig. 4 is a detail view illustrating a modification in the construction.

The improved implement comprises a pair of pliers formed of two members 10 11, pivotally united at 12 in the usual manner and with the oppositely-disposed jaws 13 14 and with a holding-link 15 at the extremities of the handles to maintain the grip of the jaws as long as required. The contiguous faces of the jaw members are formed with registering-recesses 16 17, in which linings 18 19 of yieldable material of suitable structure are compressed to hold entirely by friction. The linings will be enlarged at their ends to prevent lateral movement and will be slightly larger than the recesses, so that when compressed therein they will remain in position. One of the jaw members is extended at 20 beyond the other jaw member and preferably curved laterally at the extremity. The inner faces of the members 10 11 on the opposite side of the pivot-pin 12 from the gripping-jaws will be provided with recesses which form apertures 21 when the pliers are closed to form a convenient wire-twisting means.

With an implement thus constructed when the conductor-wiring is to be placed in position the supporting-brackets, cleats, insulator-knobs, or other supports are placed in position and the wires threaded therethrough. The wire is then clasped by the implement by placing it in the recesses 16 17 and pinched thereby with sufficient force to hold it and the link 15 closed, if necessary to maintain the grip otherwise than manually. The point of the extended jaw 20 is then placed against the edge of cleat or other support and the same employed as a fulcrum to enable a strong leverage force to be applied to the wire to strain it to any extent. Both a leverage and a torsional strain may be imparted, as will be obvious, by reason of the laterally curving and pointed form of the terminal of the extended portion 20. The implement is thus a very efficient and convenient one for the purpose named, and will enable the operator to do the required work in much less time and in a better manner than with the implements as ordinarily constructed.

The flexible members 18 19 protect the insulation upon the wires from abrasion; but when the implement is employed upon wire not covered by insulating material the flexible fillings will not be required, and in that event the apertures 16 17 will be smaller in area, as shown in Fig. 4.

Having thus fully described the invention, what is claimed is—

1. An implement of the class described comprising a pair of pliers having transverse recesses in the contiguous faces of the jaws and with one of said jaws extended longitudinally in advance of the other jaw and with said recesses lined with yieldable material.

2. An implement of the class described comprising a pair of pliers having transverse recesses in the contiguous faces of the jaws and with one of said jaws extended longitudinally in advance of the other jaw and linings of yieldable material for said recesses and larger than the same to be compressed therein to hold by friction.

In testimony that I claim the foregoing as my own I have hereto affixed my signature in the presence of two witnesses.

FREDERIC W BARBER.

Witnesses:
JNO. F. KINGSTON,
ISAAC CHADDERDON.